(12) United States Patent
Bobrow et al.

(10) Patent No.: US 6,178,308 B1
(45) Date of Patent: Jan. 23, 2001

(54) PAPER BASED INTERMEDIUM FOR PROVIDING INTERACTIVE EDUCATIONAL SERVICES

(75) Inventors: Daniel G. Bobrow, Palo Alto; John O. Everett, Redwood City, both of CA (US)

(73) Assignee: Xerox Corporation, Stamford, CT (US)

(*) Notice: Under 35 U.S.C. 154(b), the term of this patent shall be extended for 0 days.

(21) Appl. No.: 09/173,972

(22) Filed: Oct. 16, 1998

(51) Int. Cl.[7] ........................................... G09B 5/00
(52) U.S. Cl. ..................... 434/350; 434/322; 434/358; 434/362; 702/108; 382/276; 706/927
(58) Field of Search ................. 434/118, 169, 434/307 R, 308, 322, 323, 335–337, 350, 352, 353, 358, 362, 365; 345/302, 329, 336, 357, 526, 978; 380/9; 709/204; 707/1, 5, 9, 10, 102, 203, 206, 501; 382/100, 164, 191, 284, 276, 317, 318, 321; 235/440, 454, 470; 702/108; 358/1.1, 1.11, 1.12, 1.15–1.18, 1.2, 1.3, 450; 250/271; 283/94, 115; 706/927; 710/126, 128

(56) References Cited

U.S. PATENT DOCUMENTS

| 4,717,992 | * | 1/1988 | Bartenbach et al. ................. 362/217 |
|---|---|---|---|
| 4,877,948 | | 10/1989 | Krueger . |
| 4,964,066 | | 10/1990 | Yamane et al. . |
| 5,039,847 | | 8/1991 | Morii et al. . |
| 5,103,490 | * | 4/1992 | McMillin .............................. 382/284 |
| 5,134,669 | * | 7/1992 | Keogh et al. ......................... 382/318 |
| 5,140,139 | | 8/1992 | Shepard . |
| 5,267,865 | * | 12/1993 | Lee et al. .............................. 434/350 |
| 5,295,836 | * | 3/1994 | Ryu et al. ............................. 434/335 |
| 5,385,475 | * | 1/1995 | Sudman et al. .................. 434/307 R |
| 5,452,379 | * | 9/1995 | Poor ..................................... 382/317 |
| 5,590,360 | * | 12/1996 | Edwards ............................... 707/102 |
| 5,672,060 | * | 9/1997 | Poor ..................................... 434/322 |
| 5,673,399 | * | 9/1997 | Guthrie et al. ....................... 710/128 |
| 5,727,950 | * | 3/1998 | Cook et al. .......................... 434/350 |
| 5,778,368 | * | 7/1998 | Hogan et al. .......................... 707/10 |
| 5,829,983 | * | 11/1998 | Koyama et al. ..................... 434/118 |
| 5,947,747 | * | 9/1999 | Walker et al. ....................... 434/354 |
| 5,957,699 | * | 9/1999 | Peterson et al. ..................... 434/350 |
| 5,987,149 | * | 11/1999 | Poor ..................................... 382/100 |
| 6,000,945 | * | 12/1999 | Sanchez-Lazer et al. ........... 434/322 |
| 6,018,617 | * | 1/2000 | Sweitzer et al. ..................... 395/114 |
| 6,024,577 | * | 2/2000 | Wadahama et al. ................. 434/322 |
| 6,067,552 | * | 5/2000 | Yu ........................................ 707/501 |

FOREIGN PATENT DOCUMENTS 0459793    12/1991   (EP) .

* cited by examiner

*Primary Examiner*—Joe H. Cheng
(74) *Attorney, Agent, or Firm*—Richard B Domingo

(57) ABSTRACT

A system and method for providing interactive computer assisted teaching. The system is premised on and extends the ubiquitous nature of paper in classroom environments to be an interaction medium with a computer based system. By utilizing intelligent form and embedded data processing, highly interactive and customized teaching applications can be created. A student and other members of the educational community interacts with the system by making marks on an educational material and then scanning that educational material back into the system. Intelligent forms processing techniques are used to identify the marks made and pass them on to a teaching application. The teaching application will then determine an appropriate course of interaction, which may include having a responsive educational material printed out for the student. The system provides for having a single computer in a classroom, wherein students can use a familiar medium, paper, to interact with the computer. Moreover, each student in the classroom can concurrently benefit from having the computer in the classroom. Teaching applications may also be created used by the system to facilitate participation of parents and school administrators in the educational process.

17 Claims, 13 Drawing Sheets

Universal Multipurpose Form

302

Please do not write above this line.

STORE

Document name:

---

RETRIEVE

Documents:

☐ About PaperWorks forms  ☐ Using Delete forms  ☐ Using List forms
☐ Using Retrieve forms  ☐ Using Send forms  ☐ Using Store forms  } 305

---

LIST CONTENTS

Categories:

☐ ***Help Documents

Into the following form section(s):

☐ Retrieve  ☐ Send  ☐ Delete

RETURN ADDRESS

A Return Address fax number is required when you want to Retrieve, or List Contents.

Check the Fax number where items should be sent.

For U.S. calls, check numbers for area code and local number. For international calls, check numbers for country, city, and local phone number. Do not skip columns.

Mark an X in the box for each number.
Mark only one box per column.
Example: (415) 293-6870

History Test
1. Who killed Abraham Lincoln?
   - ☒ George Washington
   - ☐ Snoop Doggy Dog
   - ☐ John Wilkes Booth
   - ☐ Paul McCartney
2. When was the War of 1812 fought?
   - ☐ In the 18th century
   - ☐ 1776
   - ☐ 1812
   - ☐ 1998
3. Who said "Give me liberty or give me death?"
   - ☐ Martin Luther
   - ☐ Martin Luther King
   - ☐ Benjamin Franklin
   - ☐ Patrick Henry
Re-fetch
Help
suzuka.zircus.com
FIG. 8

History Test
1. Who killed Abraham Lincoln?
☑ George Washington
☐ Snoop Doggy Dog
☐ John Wilkes Booth
☐ Paul McCartney
2. When was the War of 1812 fought?
☐ In the 18th century
☐ 1776
☑ 1812
☐ 1998
3. Who said "Give me liberty or give me death?"
☑ Martin Luther
☐ Martin Luther King
☐ Benjamin Franklin
☐ Patrick Henry
☐ Re-fetch
☐ Help
suzuka.zircus.com
*FIG. 9*

History Test Grade Report

1. Who killed Abraham Lincoln?
Your Response:
George Washington
Correct Response:
John Wilkes Booth
INCORRECT
George Washington?!?
John Wilkes Booth was a nut.
☐ Check here to see a picture 2. When was the War of 1812 fought?
Your Response:
1812
CORRECT
It wasn't a trick question.

3. Who said "Give me liberty or give me death?"
Your Response:
Martin Luther
Correct Response:
Patrick Henry
INCORRECT
Patrick Henry made his famous exclamation in Richmond, Virginia on March 23, 1775.

Grade: 2.0 of 3 correct.

 Re-fetch   Help   
suzuka.zircus.com

FIG. 10

History Test Grade Report Followup
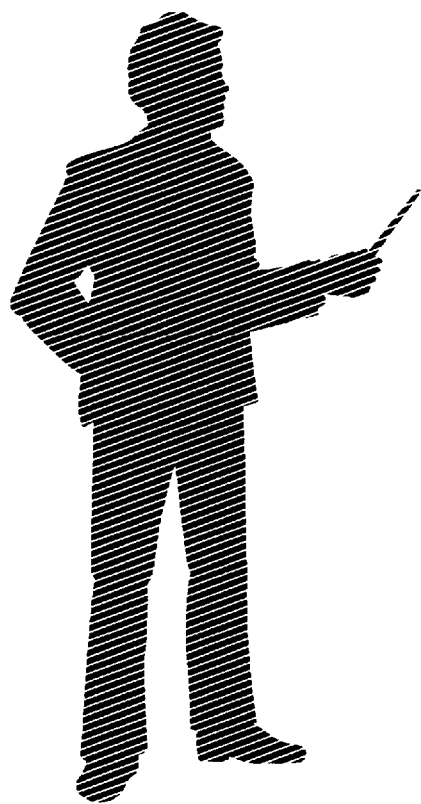
John Wilkes Booth
 Re-fetch  Help 
suzuka.zircus.com
*FIG. 11*

History Test Grading Summary
Jerry Smith
Grade: 3 of 4 correct.
George Jones
Grade: 2 of 4 correct.
Larry Kramer:
Grade: 1 of 4 correct.
3 of 3 tests completed.
Average grade: 2.0 of 4 correct.
☐ Check Here To Obtain Question/Answer Distribution
1201
  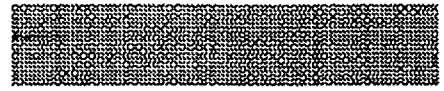
FIG. 12

US 6,178,308 B1

PAPER BASED INTERMEDIUM FOR PROVIDING INTERACTIVE EDUCATIONAL SERVICES

SUMMARY OF THE INVENTION

A system and method for providing computer-assisted teaching is disclosed. Personal Computers (PCs) are common in today's classroom, but are not available to most K–12 school students for more than special purposes. Paper and pencil are ubiquitous, but do not have the processing flexibility that one associates with PCs. With printers, paper is a computer output medium. With scanners, paper is an input medium. It has been determined that paper can be used more intimately with computer driven processes—playing a role between output and input, supporting work with paper and pencil, while enabling some of the flexibility associated with computer processes. The present invention utilizes various paper based technologies, such as embedded data, paper user interface and intelligent forms in an architecture that supports creation and execution of interactive educational applications and other teaching and student progress reporting tools.

The system of the present invention is generally comprised of one or more application preparation clients for creating teaching applications; a first database for storing educational content; a second database for storing teaching applications; an application server coupled to said first database and said second database, said application server for executing said teaching applications to prepare and process educational materials responsive to said teaching application, wherein said teaching application enables concurrent interactive engagement with multiple students through said educational materials; and a form server coupled to said application server, said form server further coupled to an output device for presenting original educational materials and coupled to an input device for receiving marked educational materials, said form server further for providing said application server with information characterizing said marked educational materials.

The method of the present invention as implemented for a teaching application would generally be comprised of the steps of: generating and printing a first educational material having user markable areas, human readable areas and an encoded data area, said human readable areas having teaching information and instructions and said encoded data area containing information relating to said first educational material; providing said first educational material to a student; said student marking said first educational material in said user markable areas responsive to said teaching information and instructions; inputting said marked first educational material to a form server; identifying a subsequent course of action based on said student markings on said first educational material such as printing out second educational material based on the marks presented on the first educational material. A subsequent or concurrent step may involve collecting information about said students learning progress based on said student annotations on said first educational material or any other educational material provided by said students. A further subsequent step may involve generating further materials based on said collected information and presenting the materials to teachers, parents or school administrators. These materials in paper form may be used as part of an interactive loop for the teacher, parents and school administrators to participate in the educational process.

BRIEF DESCRIPTION OF THE DRAWINGS

FIG. 3 illustrates an example of an instance of educational material as may be created and used by the system of the currently preferred embodiment of the present invention.

FIGS. 7–12 are examples of educational materials generated by the system of the currently preferred embodiment for a "History Test" example as may be utilized by the currently preferred embodiment of the present invention.

DETAILED DESCRIPTION OF THE INVENTION

Figure 1:
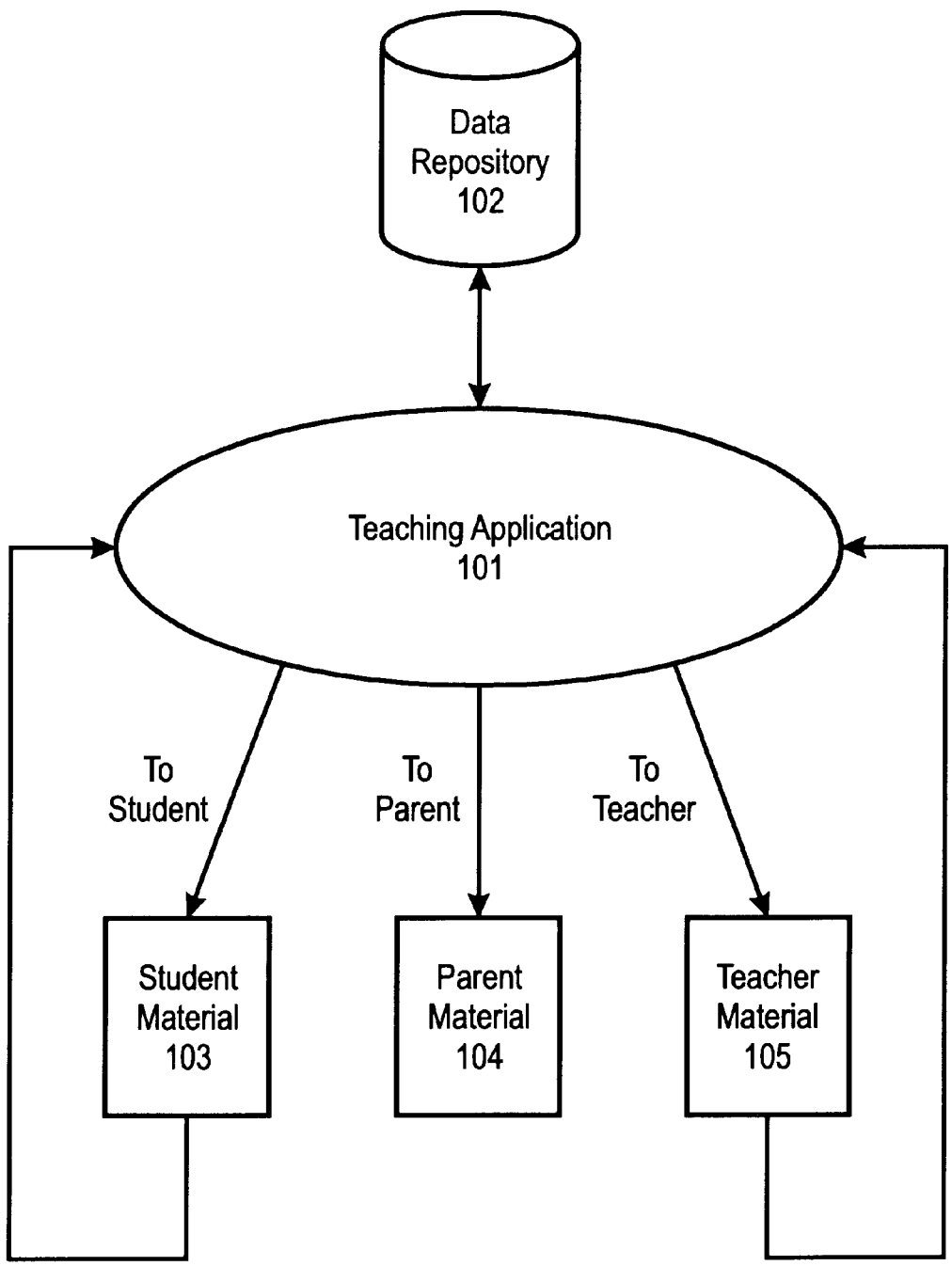
FIG. 1 is a block diagram used to present an overview of a teaching application as may be implemented in the currently preferred embodiment of the present invention.

A system and method for providing interactive computer assisted teaching is disclosed. The present invention extrapolates on the ubiquitous nature of paper in the classroom to provide a highly interactive paper form/computer implemented teaching tool. Paper is a wonderful medium. It is flicker free with a high contrast ratio, and is light, portable, and easy to write on in multiple colors. Adding highlights or annotations with a pencil is a natural and familiar task. One can assemble a large working surface by spreading out many sheets of paper. Multiple copies are easy to make and distribute. Paper is ubiquitous in classrooms, of course, but paper and computers can complement each other much more tightly using a new class of printing and scanning technologies. These technologies blur the boundary between online and off-line information, giving rise to the term intermedium, a new form that shares characteristics of digital and print media.

In this description of the present invention, the following terms will take on their indicated meanings.

The term "paper" as used herein takes on its accustomed meaning as a print medium, but also generally refers to a medium which has the dual characteristic of being able to act as an input to a system for providing information and as an output for presenting information.

The term "teaching application" as used herein refers to a user/teacher created application, which is used to facilitate the learning and information dissemination processes. A teaching application can operate in many ways. For example it can interpret student inputs provided by marks on paper and cause creation of any resulting educational materials. Other types of teaching applications can be created for generating student progress reports based on accumulated information.

The term "educational material" as used herein refers to a paper medium having a first type of area with human readable materials which a student reads and interprets, a second type of area wherein a student user may make marks which may be interpreted by the teaching application (e.g. checkboxes or areas in which students may write freely) and a third type of area containing digitally encoded information. It should be noted that an educational material is not limited to a single sheet of a paper medium. For example, a first sheet could be used as a "cover" sheet to indicate that further sheets are used to make up the educational material. This cover sheet could indicate either the number of sheets of educational material output, or the number of sheets as educational material input. Alternatively, individual sheets of an educational material may have digitally encoded information to indicate some unique information (e.g. sheet 1 of test 37, sheet 2 of test 37, etc.)

The term "student" as used herein refers generally to a person capable of having an interaction with the system. In particular, the term student will mean the person in the classroom to whom the teaching is directed. However, in different contexts, such as for different teaching applications, the term student may include teachers, parents, school administrators or anyone else involved in the educational process.

Overview of the Currently Preferred Embodiment of the Present Invention

FIG. 1 is a block diagram illustrating the basic operation and flow of a teaching application of the present invention. Referring to FIG. 1, a teaching application 101 has an interface to a data repository 102, and generally creates educational materials for three (3) types of recipients. Each of these educational materials may be used to interact with the system. A first type of educational material 103 is intended for students. This first type of educational material may be in the form of a "lesson" or test. A second type of educational material 104 is intended for parents of students. This second type of educational material may in the form of a journal of a student's work or a report on student progress, which may or may not include examples of the student's work. A third type of educational material 105 is intended for teachers or school administrators. This third type of educational material may be a reformatting of test questions for teacher grading (e.g. putting all responses to test question 1 on the same page where grades can be entered.) In the currently preferred embodiment, each of these types of educational materials is a type of paper based machine-readable form. The data repository 102 is used by a teaching application to store specific information as required by the teaching application. For example, it may be desirable to store test results or student inquiry and interaction patterns. When this information is received or otherwise derived, the information may be stored in the data repository 102 for subsequent use (e.g. by a different teaching application).

It should further be noted that each of the educational materials 103–105 may be used as an input medium back into the system. Generally speaking, predefined areas may be specified on the educational materials so that any markings made in the predefined areas will be interpreted as interactive input or as a response to information presented on the educational material. Through the recurring action of inputting marked educational materials and outputting responsive educational materials, a computer-guided interaction may occur.

While the present invention has many uses in the educational setting, its primary use is for creating PC based tools for assisting in the teaching of students. Use of the system of the present invention starts with educational materials given to the student with printed information to read, activities to do, and places on the material for them to interact. In addition, provided on each instance of an educational material is encoded data in the form of computer readable marks. These marks are used to identify the material, and perhaps information or instructions for the computer to use when the materials are scanned back in. The student engages in the various activities, marks the material in some way, and returns the materials to the teacher or brings them to a scanner. When the materials are scanned, the system acts on the information in a context-dependent way, for instance storing the material's image, interpreting the marks, or forwarding the image to an interested party. It is possible for students to use a standard sheet or set of sheets, not individually identified, and use a cover sheet specific to that student to identify the sheets read in.

Figure 2:
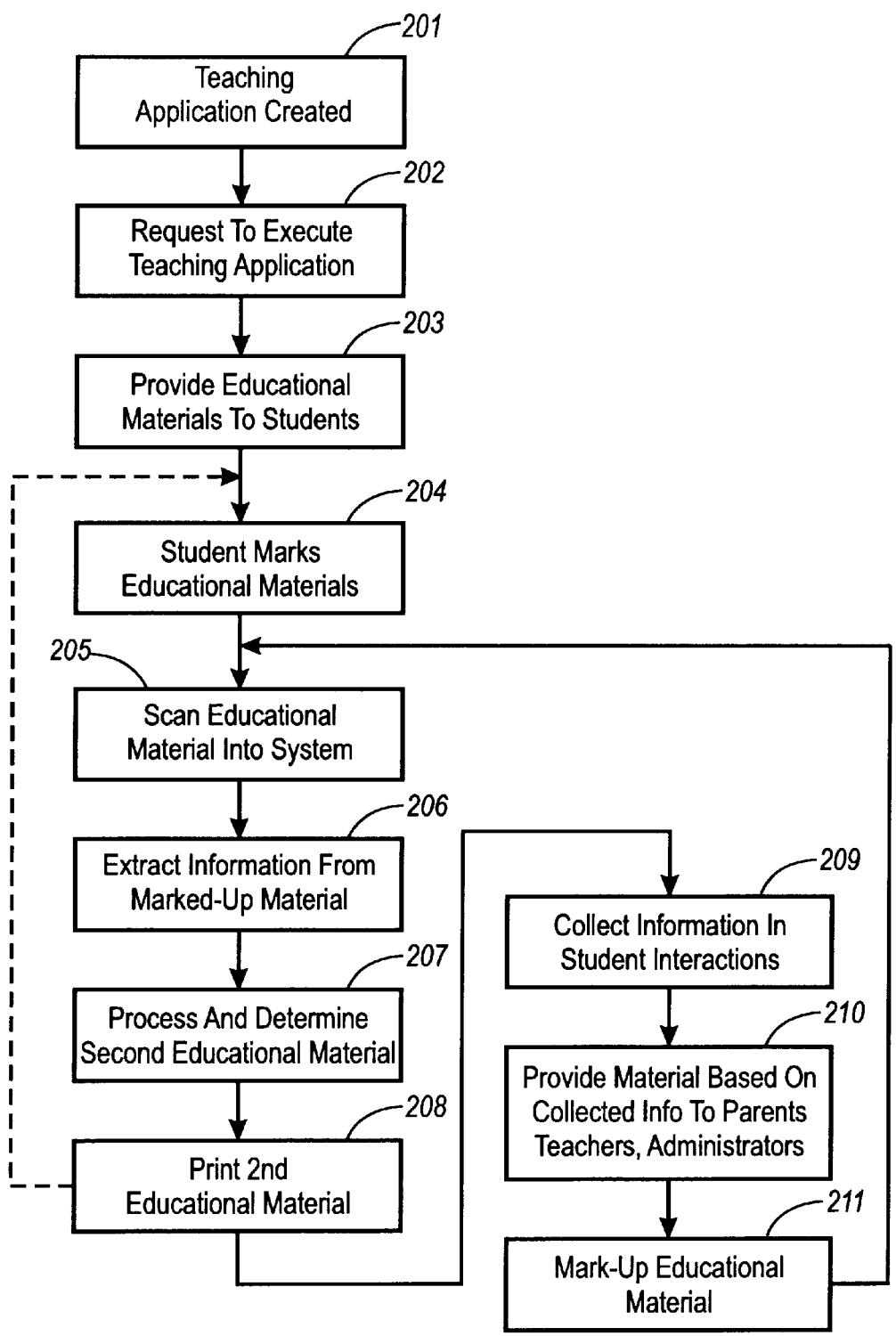
FIG. 2 is a flowchart illustrating the basic steps of an interaction between a teaching application and a student as may be performed in the currently preferred embodiment of the present invention.

FIG. 2 is a flowchart which outlines the basic steps of creating and using a teaching application for an interactive student application in the currently preferred embodiment of the present invention. First, a teaching application is created by a teacher using an application preparation tool, step 201. As will become apparent in the foregoing description, a different application preparation tool will typically be used depending on the type of educational material to be created. A request will then be made to execute the teaching application in order to obtain corresponding educational materials, step 202. Such a request may come from a teacher wishing to execute the teaching application. Alternatively, the system may be set up so that a student can make the request, for example by providing a form through which the student can select lessons. Upon receiving and processing the request, the system will then provide educational material(s) to the student(s), step 203. In the currently preferred embodiment, the educational materials are machine-readable forms that are printed out by a printer in the classroom that is coupled to the system. The student(s) will interact with the teaching application by making marks on the educational material, step 204. The marks made on the educational material will depend on the nature of the educational material, e.g. a test, lesson, feedback, etc. The student would then "scan" the educational material back to the system, step 205. The system will extract the necessary information from the educational material, e.g. form id, checkboxes checked, user marked areas, etc., step 206. The system would then process the information and determine a second educational material, based on the extracted information, step 207. The system may then print out a second educational material for the student, step 208. The steps 204–208 may then repeat so long as the student requests information. During this interactive session, the system may also be collecting information based on the student interaction, step 209. The information collected may be in the form of test scores, areas of interest, areas of expertise or the contents of user mark areas designated for freeform data entry,. Finally, suitably collected information may be provided to parents, teachers or school administrators, step 210. Generally, this information would be provided in the form of an instance of an educational material. Depending on the nature of the educational material, the receiver (e.g. parent, teacher or school administrator) may mark-up the educational material to initiate an interaction, step 211. For example the educational material may enable a parent to obtain a comparison of the students previous work such as grades or writing samples. In any event, the interaction may then loop back and iterate through steps 205–211.

Example of an Educational Material

FIG. 3 is an illustration of an educational material as may be used in the currently preferred embodiment of the present invention. Referring to FIG. 3, an educational material is generally comprised of three types of areas, area 301 with human interpretable markings, area 302 wherein marks can be made by a user and subsequently interpreted by the system, and area 303 containing encoded digital data. Such encoded data is machine-readable and is embedded in the materials as visible markings. Area 301 contains text or images that contain the information that would be read or interpreted by the student. The areas 302 are pre-designated so that system will look for any user imparted marks. The user-imparted marks may indicate a choice (e.g. a checkbox) or be information provided by the student (e.g. a freeform drawing that is part of the assignment provided by the educational material). The encoded data contained in the area 303 may include identification information about the educational material, the layout and location of the user markable areas and other desirable information such as the student receiving, date, time, etc. The information may even include authentication information, so that some degree of security may be included.

It should also be noted that any of the areas 301–303 may overlap each other. For example, the area indicated by 304 contains both an area with printed text overlaid by an area having embedded data. Further the area indicated by 305 contains text and is pre-designated to be analyzed for extracting user imparted markings.

Architecture

Figure 4:
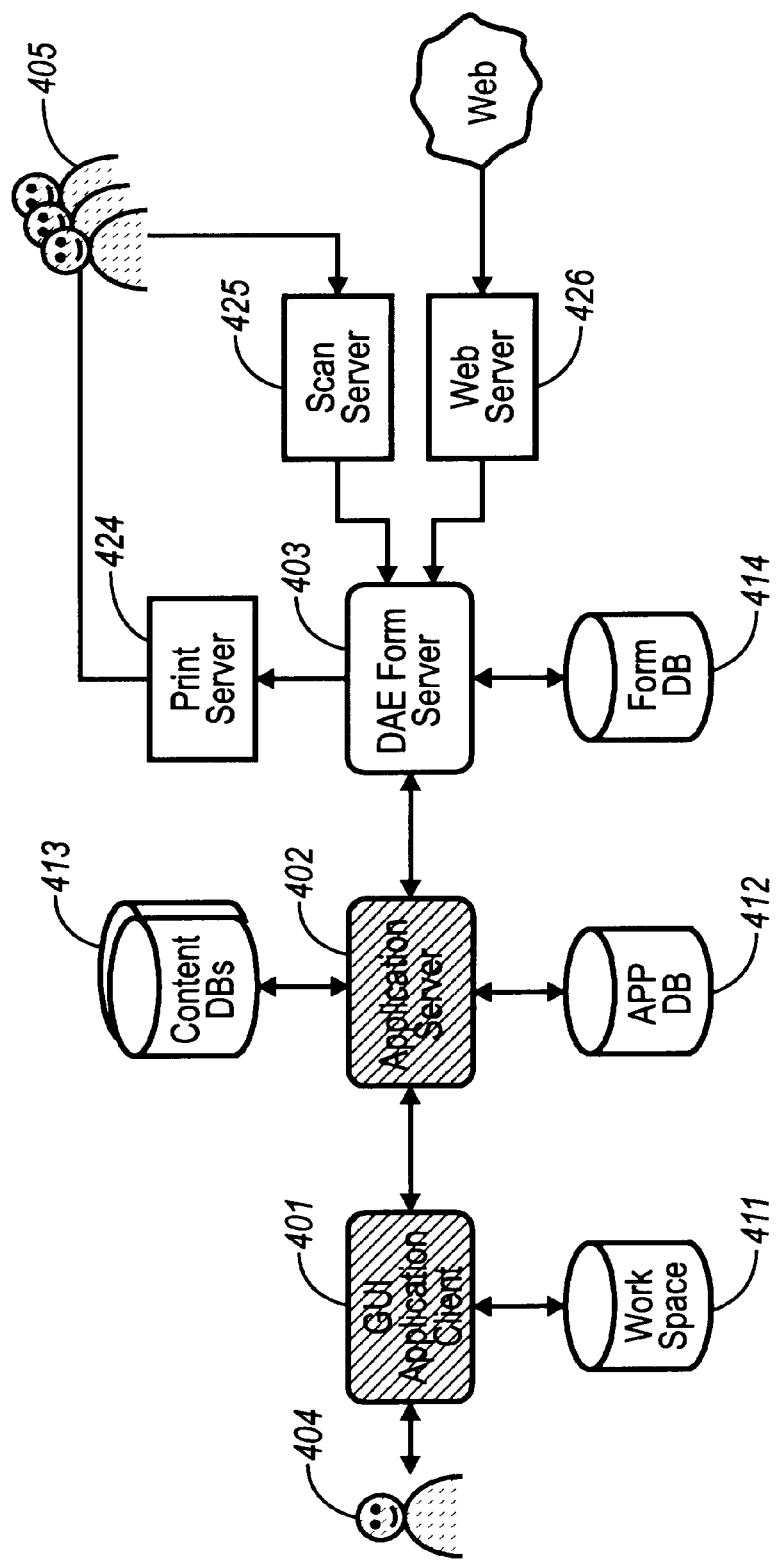
FIG. 4 is a block diagram illustrating the basic architectural components for a system implementation of the currently preferred embodiment of the present invention.

FIG. 4 is a block diagram indicating the basic components of a system implementation of the currently preferred embodiment of the present invention. Referring to FIG. 4, the architecture consists of three interacting components: an application preparation client(s) 401, an application server 402, and a form server 403. The application preparation client 401 provides a system interface for teachers 404 to create teaching applications while the form server 403 provides a system interface for students 405 to use teaching applications.

Figure 5:
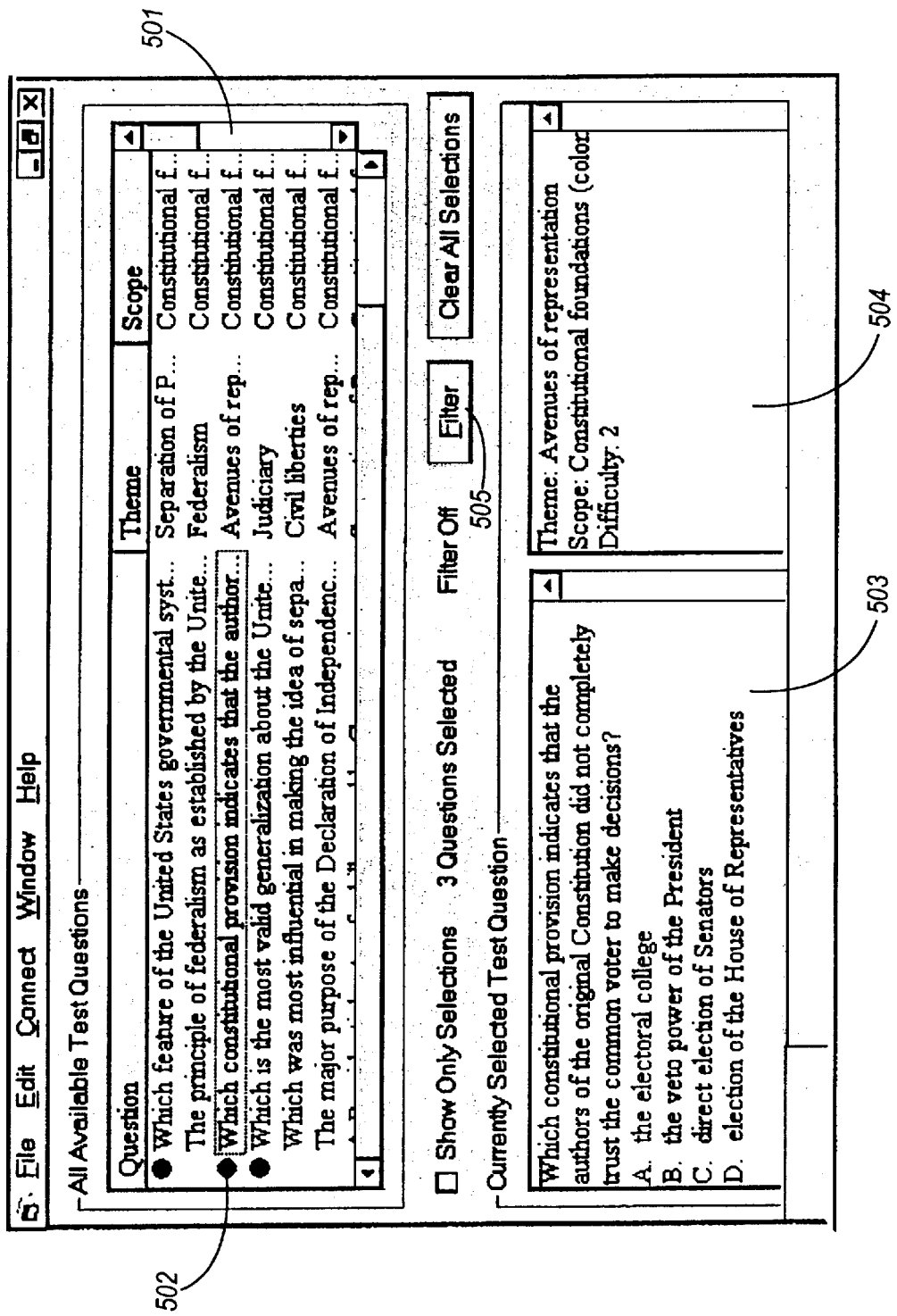
FIG. 5 is a sample screen layout of a graphical user interface for an application creation client for creating multiple choice tests as may be implemented in the currently preferred embodiment of the present invention.

The application preparation clients 401 are used by teachers 404 to create teaching applications. Each application preparation client is implemented to create applications using basic structures and primitives supported by the application server 402. The application preparation clients 401 can be used off-line by teachers, to create tests, data forms, and other data-intensive documents. Each application preparation client may be used to create a particular type of teaching application. For example, FIG. 5 provides an illustration of a user interface for an application preparation client used to create a multiple-choice test. Preferably, each application preparation client will provide a graphical user interface for creating the corresponding teaching application. In any event, referring to FIG. 5, there is an area 501 that lists a set of questions. The set of questions could have been previously composed by the teacher, by other teachers at the school, or by publishers of teaching materials. A teacher may then compose a test by selecting questions of appropriate theme, scope and difficulty.

Still referring to FIG. 5, in the area 501 those questions with a bullet next to them, e.g. question 502, have been selected for inclusion in the test. Further illustrated in FIG. 5 is a highlighted question. The highlighted question is one for which more detail is presented. The highlighted question is shown in more detail in the areas 503 and 504. In area 502, the question and its associated responses are shown, with the correct response displayed in a visually distinct manner (e.g. a different color). In area 504, the theme of the question, its scope and its level of difficulty are displayed. Note that the existence of a theme and a scope for a given test question is merely representative of the type of metadata that one might want to associate with a test question. The actual metadata that such system will ultimately support will depend on what users of the system actually find useful.

Further provided is filter button 505. The filter button 505 enables the user to display in the area 501 only questions that meet a particular criteria, such as being in a particular theme or having a particular level of difficulty.

Referring back to FIG. 4, the application preparation client 401 can also be used by teachers to interact with existing databases in the school's infrastructure. For example, the teacher might upload a class list, or a list of questions on a particular subject. The application preparation client 401 will preferably save all information necessary for the creation of a test (test questions, related hints, students taking the test) in a workspace file, e.g. workspace 411. This enables the teacher to create the test on a non-networked computer, then transfer it to a networked computer for uploading to the Application Server 402.

The application server 402 operates to enable and execute teaching applications created using the application preparation clients 401. The application server 402 implements the basic structures and primitives for creating and interpreting teaching applications. The application server 402 is the intermediary between specialized client applications that make it easy for naive users to create teaching applications (i.e. application preparation clients). This facility makes it easy for teachers to create educational materials that are then distributed to the class, and which then provide responses to the student. In the currently preferred embodiment, the application server 402 causes the layout and formatting of educational materials and responds to the scanning of a material, and uses predefined queries to create response materials for the student, or for the teacher or parents.

It should be noted that in practice two students may be using different teaching applications. The application server 402 will distinguish between the two applications and operate accordingly. When the Application server 402 receives a request from the forms server 403, it generates a new instance of an educational material and submits it to the forms server 403 for conversion into a form suitable for printing. This form may encode various factors relating to the interaction, e.g. the fact that the student requested further information, should the teacher wish to factor this into the grading.

The currently preferred embodiment implements applications using object oriented programming techniques. Within the system, object classes for entities such as student, teacher, classroom, test, problem, query, choice, and response are defined and stored in an object-oriented database. These classes contain extensive sets of properties, and the application preparation client provides a facility for selecting a relevant subset of these properties and mapping them to the data in existing databases. The manner of implementation of such classes would be known to one of skill in the art of object-oriented programming, thus details on the object definition are not deemed necessary. For example, a database of multiple choice test problems may contain, for each problem, the question, four responses, a difficulty score and a reference to the relevant chapter of the textbook. The user would map the question, responses, and difficulty directly to those properties of the problem object, the chapter field to the scope property, and mark the rest of the properties as unused. Preferably, the user will be able to add new properties to the classes.

The application server 402 is coupled to application database 412. The application database 412 includes the various teaching applications, which may be executed by the application server 402. The application server 402 may also be coupled to content databases 413. Such content databases 413 may be from school repositories (e.g. class lists) and from publishers (e.g. list of questions).

The application server 402 further provides a query language that supports the creation of objects. A query can create, for example, a random list of questions from a database or a response to a test that selects the response for each question.

In the currently preferred embodiment, for creation of the educational materials that will be provided to students, the form server 403 receives from the application server 402 a description of the educational materials to be printed. The educational materials will typically correspond to predetermined form layout or type. The form layout or type is stored in forms database 414. Included with the materials is any information needed to uniquely identify the instance of the educational materials. Upon receiving a request to print educational materials, the form server 403 returns to the application server 402 a Unique Identifier (D-UID) for that instance of an educational material. This identifier may be used to track interactions based on the corresponding educational material. The form server 403 is further comprised of a print-server 424, scan-server 425 and optionally, a web-server 426. On demand the form server 403 can print out any form utilizing the print-server 424. Note that the actual printing can occur locally through an attached printer device, or remotely through a networked printing device or a facsimile device. The form server 403 can also provide the same form to a web browser. The form server 403 services any scanning of pages that come back in through the scan-server 425.

With respect to the scan-server 425, for each sheet (or document), the scan-server 425 creates an input record that consists of the form uid, and for any FIELD, the specification provided by the HTML form, plus the interpretation obtained from the processing routine for that portion of the page. It should be noted that the actual scanning of the educational material can occur locally through an attached scanning device, or remotely through a facsimile device. The default interoperation routine returns the TIFF scan of that portion of the page. But, for example, a check box interpreter within the scan-server 425 may simply return a Boolean indicating whether or not that box was checked. The form server 403 then notifies the application server 402 that the materials have been received.

The web-server 426 provides for web-enabled teaching applications. With respect to the web-server 426, it provides the same fields that users can work on either on a device that supports direct writing, or using special input modes for the web (e.g. clicking in a check box, typing in a text input field). The web page would require a SUBMIT button, and when that button is clicked, the form server 403 treats the filled in page in the same way as if it had scanned the document, creating a similar record.

In the currently preferred embodiment, the form server 402 knows nothing about the specific application for which it is serving forms. When the form server receives a request for particular content (for example, a student requests a hint by checking a box and scanning in the test page), it passes on the request to the Application server 402. As noted above, the Application server 402 maintains a database of application specific information that the user, via the application client, has assembled and uploaded for the support of a particular teaching application. This might, for example, include current grade-point average for all students taking the test and several different responses for each question, to be served out depending on the student's GPA (smarter students might get more challenging hints).

Figure 6:
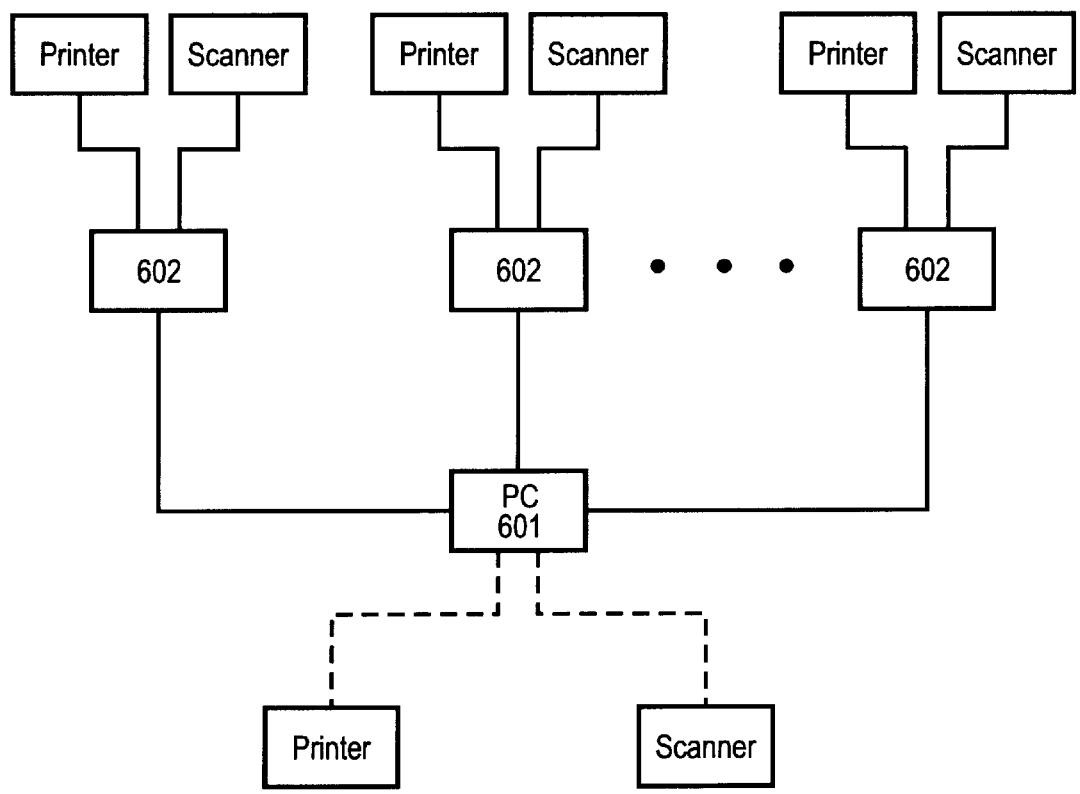
FIG. 6 is a block diagram of a classroom system implementation of the currently preferred embodiment of the present invention.

FIG. 6 illustrates in block diagram form, a hardware system in a classroom for carrying out the present invention. A personal computer (PC) 601 is used to execute software programs embodying the present invention. On this personal computer, at least the application server must be executing. Other workstations 602 may be present in the classroom, each implementing the functionality of a form server. Alternatively, the PC 601 may also include the functionality of the form server.

Coupled to one or more of the form servers are a printer 603 and/or a scanner 604. Depending on the configuration, a workstation may only perform printing functions (output generation) or scanning of educational materials (input function) or it may have both.

Enabling Technologies

The currently preferred embodiment of the present invention utilizes various existing systems technologies, such as object-oriented programming, client-server architectures, as well as various existing document technologies, such as embedded data, paper user interface and intelligent forms. As noted in the description above, the systems technologies used would be well known to one of skill in the art. For example, the currently preferred embodiment has been implemented in the Java® (a registered trademark of Sun Microsystems, Inc.) programming language. Described below are brief descriptions of the existing document technologies utilized in the currently preferred embodiment.

The printing and scanning as embodied in the form server will include a few fundamental functions. First, any data, such as a student's name or a tag that identifies a specific sheet of paper, can be encoded and embedded on paper in a machine readable form that is easy to recover when the sheet is scanned back in. Therefore individual sheets can have an identity and be tracked, and they can hold computer-readable instructions for what the computer should do with them after they are scanned. In the currently preferred embodiment, the encoding and embedded data technology preferably used is DataGlyphs® from the Xerox Corporation. Second, check boxes (i.e. user markable areas) can be printed on a page, and the system can tell whether the box has been marked. Check boxes are a special case of a rectangular areas identified on a printed page, typically called fields (and which have been referred to herein as user markable areas). Marks made in a field can be extracted, and interpreted according to a specified type. The area could have preprinted material. Interpretation of the marks made in these fields can be dependent on those previously defined marks. The system is intended to support incorporation of new interpretation routines.

Below are some examples of some useful interpretations of areas containing user marks, which have been found to be useful.

Check boxes (is it filled enough)

Circling of an answer

Qualitative value (relative position of a mark along a printed axis)

Data points (position of dots on a graph where axes have been provided)

Free form graph on axes

Free text writing or drawing (saved as an entity)

Below are examples of known technologies that may be utilized to support the functionality of the implementation of the present invention.

U.S. Pat. No. 5,060,980 entitled "Form Utilizing Encoded Indications For Form Field Processing", which is assigned to the same assignee of the present application, describes a type of intelligent form that may be used to implement the educational materials of the present invention. Generally speaking, the form contains embedded data, which provides information as to how the form should be processed. The information may include: form identifiers, indications where checkboxes are positioned on the form, etc. This information would be extracted by the form server and then passed on to the application server for further processing.

A commercially available package for creating such intelligent forms is the SmartPaper Toolkit, available from the Xerox Corporation.

U.S. Pat. No. 5,486,686 entitled "Hardcopy Lossless Data Storage and Communications For Electronic Document Processing Systems", describes how embedded data can be used to bridge the paper and electronic domains using, in one embodiment, DataGlyphs. It should be noted that alternative embedded data techniques may be used to implement the present invention, e.g. bar codes, and would not cause departure from the spirit and scope of the present invention. DataGlyph technology uses the symbols "\" and "\" to represent binary information. It has been determined that these symbols can be combined to create very non-obtrusive areas of embedded data on paper.

History Test Example

Figure 7:
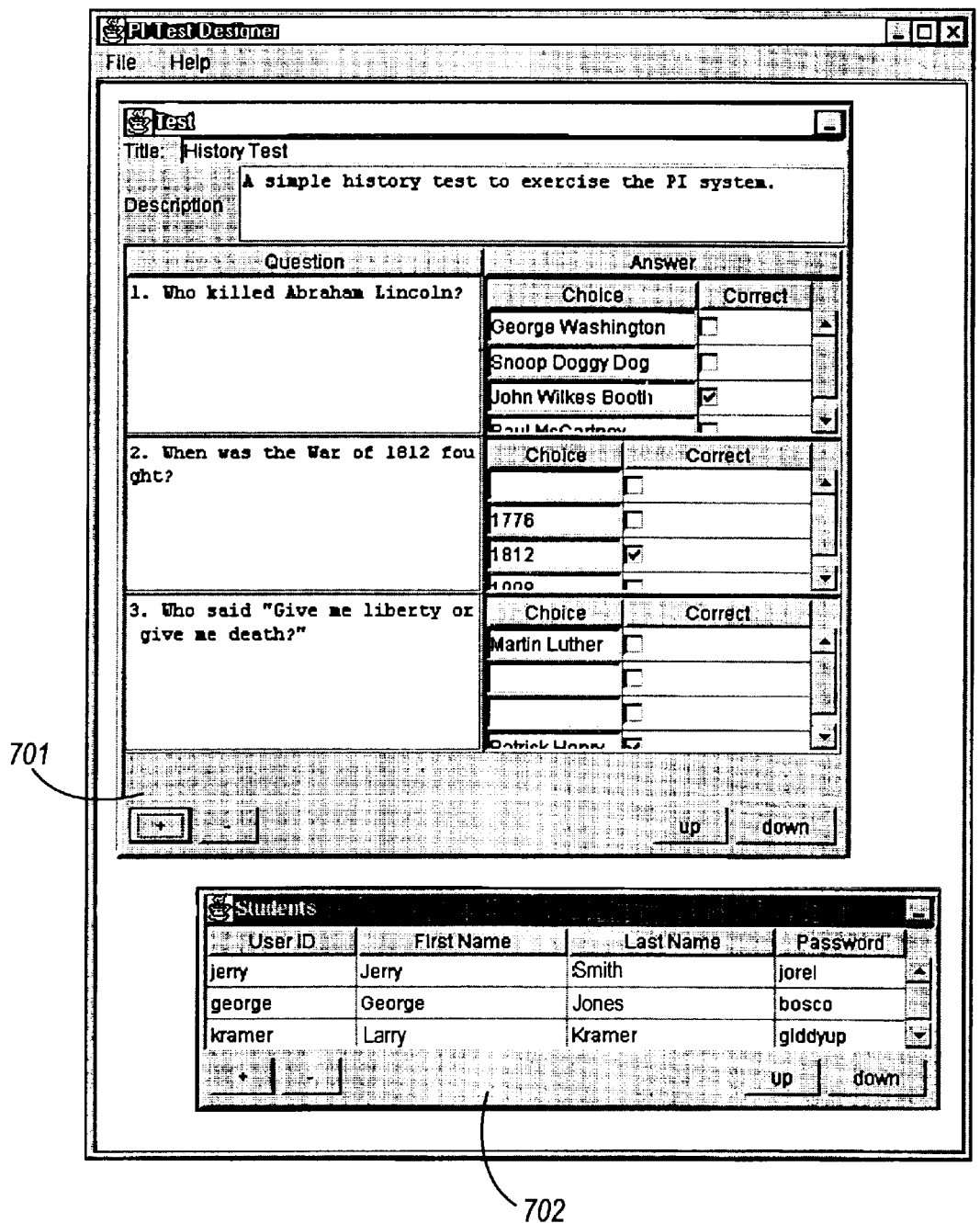

FIGS. 7–12 illustrate an example of how the currently preferred embodiment may be used for creating a history test, which includes the ability to obtain follow-up information. Referring to FIG. 7, a sample screen layout for an application preparation client is presented. Referring to FIG. 7, a first window 701 is used for test composition and a second window 702 is for indicating and selecting the students who will be taking the test. In window 701, the questions are presented, along with choices and an indication of the "correct" answer. Associated with each response is a message that is returned to the student if they select that response. FIG. 8 is an illustration of an educational material representing the test, and FIG. 9 is a marked-up copy containing student responses. FIG. 10 illustrates a returned graded test. Note that in this example, an opportunity to obtain more information is presented. This comes in the form of a checkbox that the user can mark and then re-submit. Note that here it is indicated that the student would like more information about a particular subject. FIG. 11 illustrates an example of a response for more information based on the user's input.

FIG. 12 illustrates a grading summary report, which may be used by the teacher to quickly view, a summary of the results of the test. Further illustrated in FIG. 12 is a checkbox 1201. This checkbox would enable a teacher to obtain a distribution of the class performance on a particular question. This is an example of enabling a subsequent teacher interaction with the system.

Scenarios

Provided below are a set of scenarios which are further indicative of the breadth and scope of types of Teaching Applications and Educational Materials that may be provided by the present invention. These scenarios illustrate different features of the architecture and applications that may be supported. An important distinguishing feature of many of these scenarios is that, unlike simple forms processing, where a form is printed and the results scanned later to complete the process, after scanning other sheets of paper are printed to be returned to the students individually or as a class, provided to the teacher, or made available for parents.

Multiple choice questionnaires: A multiple choice questionnaire (perhaps a test, perhaps a self-evaluation for the student) is given to each student. The students check off the answers, and each brings the questionnaire to the scanner when ready. Immediately after scanning, the printer nearby generates an annotated version of the input.

Question 1—very good answer—and if you want to know more about this aspect . . . , check this box and rescan.

Question 2—No that answer is not right. You may be confused about . . . If you want to try again here are the other choices . . .

Question 3—You asked for a hint. Think about . . . and now what do you think the answer is?

The student takes the newly printed sheets back to his or her desk to work. The teacher gets a summary of what the students have done. This example stresses the ease with which this fits some current teacher practices, but provides the flexibility of specific feedback one associates with a student working at a computer.

Student essay exam: Students are given a set of essay questions, with a space on a page to write their answers. When the student exams from the entire class have been scanned, the teacher prints out sheets sorted by question, so that all the answers to question 1 are together. In addition, next to each question is a set of check boxes associated with rubrics (criteria for grading essays) that allow easy marking of standard aspects of the exam (for example, a check box in box A means they didn't have a topic sentence). In addition there is space for the teacher to write a comment for the student in a special area, or right on the text. The teacher can check boxes that are interpreted as "provide the following reference link that the student can follow," or "store this in the student's portfolio to be provided to their parents as an example of this student's work." The teacher's sheets are scanned back in and the student test is reconstructed from the images with the comments from the teacher, the extended links (check boxes they can use to get additional information), etc. If rewriting is useful, the student can do that right on the same paper, and scan the result back into the computer for regrading.

Off-line preparation: Each student team (perhaps pairs) gets background reading for an ecology experiment involving relationships between wolf, elk, and cattle populations at Yellowstone Park. The written materials contain short exercises to check comprehension, including several where the students are asked to predict how the animal populations will vary under different conditions by drawing graphs and writing comments to explain their reasoning. When the pages are scanned in, the predictions become part of the team's permanent, on-line notebook. Next, students actually run the experiment with the ecology simulator, viewing both the simulated population curves and their earlier predictions. Online, they discuss with each other and with adult mentors significant features of the differences between what they predicted and what happened.

This example stresses off-line preparation for an online experience, while bringing some of that preparation online to support discussion with people not physically present (e.g., mentors) and to provide archiving.

Publisher collaterals: The background reading in the ecology example contains references to more detailed articles stored at the publisher's web site. A published workbook includes a form for ordering additional materials, so that when the form is scanned, these materials are actually fetched from the publisher and printed locally. The references that appear in the workbook are handles on the kind of additional information desired, as the actual articles returned may change over time. For instance, one kind of reference might cause the publisher's Web site in turn to search publicly available news sources for recent stories on Yellowstone.

In this example, the present invention offers convenience—a way of encapsulating a Web locator for additional resources so that teachers and students needn't deal directly with long names of Web resources assembled by the publisher.

Field data collection: The teacher prepares a form for collecting data about a stream's ecology, including check boxes for the plant species expected, blank space for additional species found, line charts (to which ticks can be added for measurements) for recording water and temperature levels, a map of the stream to indicate where the sample was recorded, and check boxes to identify the student and the date. Many copies of this form are made for the students to take home after school. As they are returned, they are scanned and the data are aggregated and displayed in the classroom to give a growing view of their collective research results. This example stresses the teachers' ability to create customized, portable documents and replicate them easily and cheaply.

Mentor comments: A mentor from a retirement home who can only be on-line sporadically gets a paper summary of a series of experiments run by a student. Drawing on the paper, he points out some features of the graphs and comments on the explanations students have offered. After scanning, these are available next time the student gets back online and can provide the basis for further conversation. This example stresses paper's portability and ability to compensate in some ways for limited access to computers by people outside of school.

Surveys and tests: Students fill out multiple choice surveys (e.g. on reading attitudes) which, when returned, are automatically scored and collated. Particular kinds of responses could be flagged by software and a response given to the student or to the teacher. For instance, if a student responds favorably to particular survey topics, the student might be directed toward further reading on that topic or paired with students with similar interests. This example stresses automation of a repetitive task and generation of customized responses.

The tools needed to do most of these examples are simple, flexible, and cheap, given the availability of printers and scanners. These example scenarios are not inclusive of all the ways that the present invention may be used.

An interesting artifact and observation of the present invention is that it facilitates student notetaking. By retaining each of the educational materials, the student is able to maintain a hardcopy record, e.g. notes, of a lesson. These notes may be used for review for testing purposes.

Figure 13:
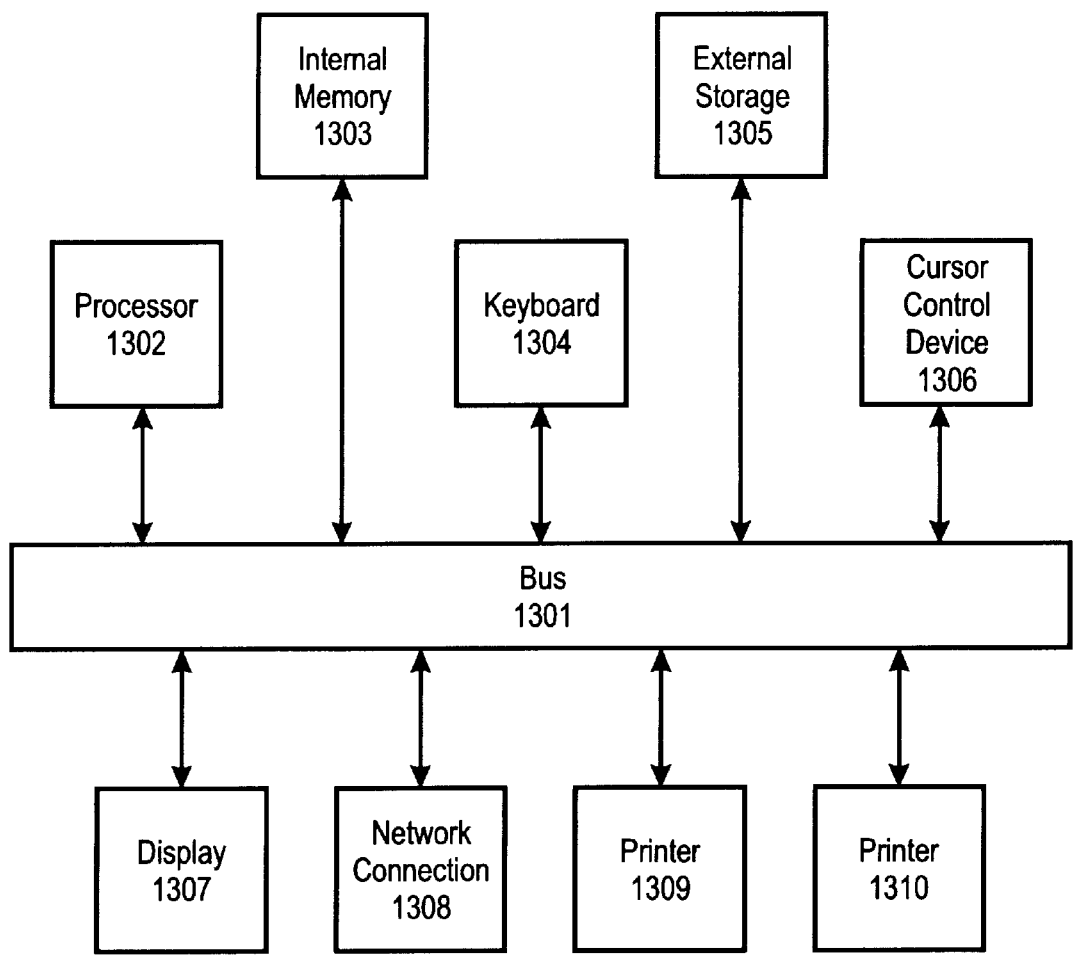
FIG. 13 is a block diagram of a computer-based system upon which the present invention may be utilized.

Overview of a Computer Controlled Display System In the Currently Preferred Embodiment of the Present Invention The computer-based system on which the currently preferred embodiment of the present invention may be implemented is described with reference to FIG. 13. As noted above, the present invention is implemented using software-programming instructions for execution on a computer based system. The computer based system and associated operating instructions (e.g. software) embody circuitry used to implement the present invention. Referring to FIG. 13, the computer-based system is comprised of a plurality of components coupled via a bus 1301. The bus 1301 may consist of a plurality of parallel buses (e.g. address, data and status buses) as well as a hierarchy of buses (e.g. a processor bus, a local bus and an I/O bus). In any event, the computer system is further comprised of a processor 1302 for executing instructions provided via bus 1301 from Internal memory 1303 (note that the Internal memory 1303 is typically a combination of Random Access and Read Only Memories). The processor 1302 will be used to perform the various processes of the present invention as described generally in the flowchart of FIG. 2. Instructions for performing such operations are retrieved from Internal memory 1303. The operations would typically be provided in the form of coded instructions in a suitable programming language using well-known programming techniques. The processor 1302 and Internal memory 1303 may be discrete components or a single integrated device such as an Application Specification Integrated Circuit (ASIC) chip.

Also coupled to the bus 1301 are a keyboard 1304 for entering alphanumeric input, external storage 1305 for storing data, a cursor control device 1306 for manipulating a cursor, a display 1307 for displaying visual output and a network connection 1308. The keyboard 1304 would typically be a standard QWERTY keyboard but may also be telephone like keypad. The external storage 1305 may be fixed or removable magnetic or optical disk drive. The cursor control device 1306, e.g. a mouse or trackball, will typically have a button or switch associated with it to which the performance of certain functions can be programmed. Note that in some implementations, the keyboard 1304, cursor control device 1306 and display 1307 may note be needed. The network connection 1308 provides means for attaching to a network, e.g. a Local Area Network (LAN) card or modem card with appropriate software. The network connection 1308 may further provide access to the Internet, but it may be through proxy servers or intermediary networks or dial-up services.

Finally, also coupled to the bus 1301 are printer 1309 and scanner 1310. The printer 1301 and scanner 1310 represent the preferred input and output devices, respectively, for the present invention.

Thus, a system and method for computer assisted teaching has been disclosed. While the present invention is described with respect to a preferred embodiment, it would be apparent to one skilled in the art to practice the present invention with other configurations of computer based systems. Such alternate embodiments would not cause departure from the spirit and scope of the present invention

We claim:

1. A system for computer assisted teaching comprising:
a first storage device for storing educational content;
a second storage device for storing a teaching application;
an application server coupled to said first storage device and said second storage device, said application server for executing said teaching application to prepare and process educational materials that contain said educational content responsive to said teaching application, wherein said teaching application enables concurrent interactive engagement with multiple students through said educational materials;

a form server coupled to said application server to receive said prepared educational materials, said form server coupled to an output device for output of original educational materials and coupled to an input device for receiving marked educational materials for said teaching application, said form server further for providing said application server with information characterizing said marked educational materials.

2. The system as recited in claim 1 further comprising a third storage device for storing forms, said third storage device coupled to said form server, wherein said form server utilizes forms in said third storage device for extracting information from said marked educational materials.

3. The system as recited in claim 1 wherein said output device is a printer and said input device is a scanner.

4. The system as recited in claim 1 further comprising an application preparation client for preparing teaching applications.

5. The system as recited in claim 1 further comprising a plurality of application preparation clients, each of said plurality of application preparation clients for preparing a particular type of teaching application.

6. The system as recited in claim 1 wherein an instance of an educational material has at least one user mark area wherein a user may make marks and said form server is further comprised of circuitry for identifying user marks being made in said user mark area.

7. The system as recited in claim 1 wherein an educational material on a medium will have human readable markings, at least one user mark area, and embedded digital data.

8. The system as recited in claim 1 wherein said application server is further comprised of circuitry for preparing an electronic representation of an educational material and circuitry for causing predetermined operations to occur based on the effect of marks on said marked educational material.

9. A method for computer assisted teaching comprising the steps of:
   a) generating a first educational material having a user markable part and a human readable part, said human readable part having teaching information and instructions;
   b) providing said first educational material to a student;
   c) said student marking said first educational material in said user markable part responsive to said teaching information and instructions;
   d) said student inputting said marked first educational material;
   e) determining said marked first educational material contains an indication to create a second educational material;
   f) repeating steps b)–e) for said second educational material and subsequent educational materials until a marked educational material does not contain an indication to create another subsequent educational material.

10. The method as recited in claim 9 further comprising the step of collecting information about said students learning progress based on said student markings on said educational material.

11. The method as recited in claim 9 wherein said step of generating a first educational material is further comprised of the step of printing said first educational material responsive to a teaching application.

12. The method as recited in claim 11 wherein said step of said student inputting said marked first educational material is further comprised of the step of inputting said marked first educational material into a scanner to create an electronic image representation of said marked first educational material.

13. The method as recited in claim 12 wherein said step of determining said marked first educational material contains an indication to create a second educational material is further comprised of the step of determining from said electronic image representation of said marked first educational material whether a user mark has been made in said user markable area.

14. The method as recited in claim 10 wherein said step of collecting information about said students learning is further comprised of the step of extracting user markable areas as examples of student's work.

15. The method as recited in claim 14 wherein said method further comprises the steps of generating a third educational material using said collected information, said third educational material including examples of student's work.

16. The method as recited in claim 15 wherein said method further comprises the step of receiving as input said third educational material.

17. A program storage device readable by a machine, tangibly embodying a program of instructions executable by the machine to perform method steps for an interactive teaching application, said method comprising the steps of:
   a) generating a first educational material, said first educational having a user markable part and a human readable part, said human readable part having teaching information and instructions;
   b) providing said first educational material to a student, wherein said student marking said first educational material in said user markable part responsive to said teaching information and instructions;
   c) receiving an electronic representation of said marked first educational material;
   d) determining from said electronic representation that said marked first educational material contains an indication to create a second educational material;
   e) preparing said second educational material;
   f) generating said second educational material;
   g) repeating steps b)–f) for said second educational material and subsequent educational materials until a marked educational material does not contain an indication to create another subsequent educational material.

* * * * *